United States Patent
Kusase

Patent Number: 5,132,581
Date of Patent: Jul. 21, 1992

[54] AC GENERATOR WITH ANNULAR PERMANENT MAGNETS

[75] Inventor: Shin Kusase, Obu, Japan

[73] Assignee: Nippondenso Co., Ltd., Kariya, Japan

[21] Appl. No.: 658,851

[22] Filed: Feb. 22, 1991

[30] Foreign Application Priority Data

Feb. 26, 1990 [JP] Japan ................... 2-045270

[51] Int. Cl.$^5$ .................. H02K 9/06; H02K 19/22
[52] U.S. Cl. ..................... 310/263; 310/62; 310/63; 310/181
[58] Field of Search .................. 310/49 A, 62, 63, 156, 310/181, 263, 267, 68 D

[56] References Cited

U.S. PATENT DOCUMENTS

| | | | |
|---|---|---|---|
| 4,388,545 | 6/1983 | Honsinger et al. | 310/156 |
| 4,451,749 | 5/1984 | Kanazama et al. | 310/62 |
| 4,459,501 | 7/1984 | Fawzy | 310/156 |
| 4,656,551 | 3/1987 | Farr | 310/112 |
| 4,659,950 | 4/1987 | Gotoh | 310/59 |
| 4,794,285 | 12/1988 | Nimura et al. | 310/68 D |
| 4,882,515 | 11/1989 | Radomski | 310/263 |
| 5,046,150 | 9/1991 | Rom et al. | 310/68 D |

FOREIGN PATENT DOCUMENTS 61-85045 4/1986 Japan .
63-77362 4/1988 Japan .

Primary Examiner—Steven L. Stephan
Assistant Examiner—Dennis R. Haszko
Attorney, Agent, or Firm—Cushman, Darby & Cushman

[57] ABSTRACT

In an AC generator having a plurality of claw-shaped magnetic pole portions in a rotor, a pair of projected portions which extend toward an outer circumference from both ends of boss portions on an outer circumference of a shaft are provided, and permanent magnets are also provided so as to abut against the projected portions so that magnetic flux is applied in the same direction as the magnetic flux applied to the projected portions when an electric current is applied to a field winding which is wound around the boss portions. With a magnetic path thus constructed, it is possible that the magnetic flux if permanent magnets is put on the magnetic flux produced by a field winding, thus applying much magnetic flux to the stator. As a result, the output per weight can be increased.

7 Claims, 2 Drawing Sheets

AC GENERATOR WITH ANNULAR PERMANENT MAGNETS

BACKGROUND OF THE INVENTION

1. Field of the Invention

The present invention relates to a generator used in an automobile and the like, and more particularly to an AC generator having a plurality of claw-shaped magnetic pole portions as a rotor.

2. Description of the Related Art

In some conventional units, permanent magnets are inserted among a plurality of claw-shaped magnetic pole portions, and leakage flux generated among magnetic pole portions is made to be repelled so as to reduce the leakage flux as shown in JP-A-61-85045. Namely, the magnetic flux generated with a field winding is applied toward a stator side, thus increasing effective magnetic flux which acts on the stator so as to increase power generation output.

In a conventional AC generator, though a heavy part such as a permanent magnet is added, only leakage among magnetic pole portions is prevented. Therefore, from a viewpoint of improving output per weight the effects are very small.

SUMMARY OF THE INVENTION

It is an object of the present invention to utilize a permanent magnet effectively for simplifying prevent leakage flux increase the output per weight by applying magnetic flux which may be generated originally by the permanent magnet to the magnetic flux generated by the field winding.

Thus, in order to achieve the above-mentioned object, according to the present invention, there is provided an AC generator, including: a rotor having at least a first and second magnetic pole core opposing each other and similar in shape and size with a center hole for piercing by a shaft of said rotor, said first and second magnetic pole cores including a boss portion of cylindrical form having a given wall thickness, a projected portion extending from said boss portion in a radial direction of said rotor, and a claw-shaped magnetic pole portion extending in an axial direction of said rotor from an end of said projected portion extending in said radial direction of said rotor, wherein claw-shaped magnetic pole portions of a said first and second magnetic pole cores extend in opposite axial directions of said rotor and oppose each other in said axial direction; a stator disposed around said rotor with a predetermined gap between said stator and said rotor, said stator having a stator winding; a field winding wound on portions of said base portion of said first and second magnetic pole cores extending towards the interior of said rotor for supplying magnetic flux to said rotor in a given direction when electric current is applied to said field winding; at least one doughnut shaped permanent magnetic plate magnetized in a direction of thickness, and fixed to an exterior side face of a projected portion of one of said first and second magnetic pole cores for supplying magnetic flux in said given direction; and at least one doughnut shaped yoke plate abutting an exterior face of said permanent magnetic plate and attached to a claw-shaped magnetic pole portion of a magnetic pole core to which said permanent magnetic plate is not fixed.

Permanent magnets are installed so as to abut against the projected portions of the rotor, and the magnetic flux of the permanent magnets is added to the magnetic flux generated in the field winding; thereby making it possible to apply increased magnetic flux to the stator.

Further, since the magnetic flux of the permanent magnets does not flow in the boss portions of the rotor, it is possible to make the cross sections of the boss portions small; resulting in a reduction of the outside diameter of the boss portion.

As described above, there are such excellent effects according to the present invention that it is possible to apply increased amounts of magnetic flux to the stator improving the output of the AC generator by a large margin, and to miniaturize the whole rotor or make the space between the field winding and the claw-shaped magnetic pole portions large so as to perform cooling of the field coil by making the boss portions small.

DESCRIPTION OF THE PREFERRED EMBODIMENTS

Figure 1:
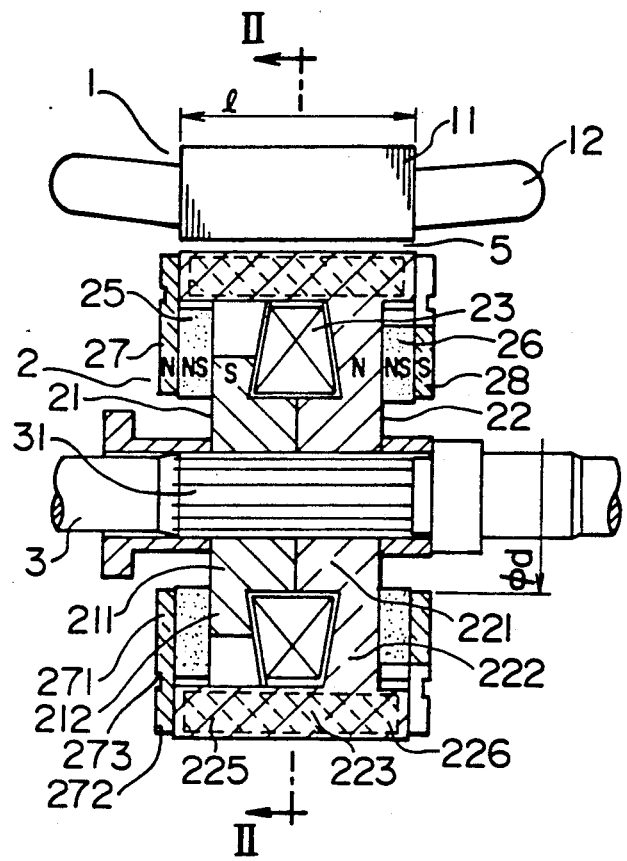
FIG. 1 is a sectional view showing a principal part of an AC generator of the present invention.

FIG. 1 shows a section of a stator 1 and a rotor 2 of an AC generator for a vehicle. The stator 1 includes an iron core 11 of cold rolled low carbon steel plate of approximately 0.6 mm thick, t, and a three phase armature winding 12. The iron core 11 is formed by punching and laminating thirty-six slots 111 to produce tooth portions 112 of a given width, W, projecting from back portion 113. The three phase armature winding 12 being wound and insulated in the slots 111. The rotor 2 is constructed with a pair of magnetic pole cores 21 and 22 which are faced to each other. The pole cores each comprises 6 pieces of claw-shaped magnetic poles forged from low carbon steel. Each of the magnetic pole cores 21 and 22 includes cylindrical boss portions 211 and 221 respectively, pierced by a rotary shaft 3, and projected portions 212 and 222, respectively, which extend in a radial direction of the rotor from boss portions 211 and 221. Furthermore, claw-shaped magnetic pole portions 213 and 223 provided at equal intervals in an axial direction of extend of the boss portions 211 and 221 from the respective ends of the projected portions 212 and 222.

A knurled portion 31 is formed on the outer surface of the rotary shaft 3 to which rotation of an engine (not shown) is conveyed through a belt, and a pair of magnetic pole cores 21 and 22 are press-fitted to the knurled portion 31 with both boss portions 211 and 221 opposing each other and fixed on the rotary shaft 3. Furthermore, the claw-shaped magnetic pole portions 213 and 223 of a pair of magnetic pole cores 21 and 22 are disposed alternately at equal intervals. Additionally, integral with the outer surface of claw-shaped magnetic pole portions 213 and 223 are collar portions 214 and 224, respectively. Collar portions 214 and 224 extend in a circumferential direction of the rotor 2 from the outer surface of claw-shaped magnetic pole portions 213 and 223, respectively. Edges 215 and 216 integral with claw-shaped magnetic pole portions 213, and edges 225 and 226 integral with claw-shaped magnetic pole portions 223, extend in the axial direction of the rotor 2 beyond the outer side faces of projected portions 212 and 222 as shown in FIG. 3.

Further, a field winding 23 is wound around the outer cylindrical surface of the boss portions 211 and 221 of magnetic pole cores 21 and 22. The ends of this field winding 23 are connected to commutators (not shown) so that an electric current is applied from an external power source through brushes.

Figure 2:
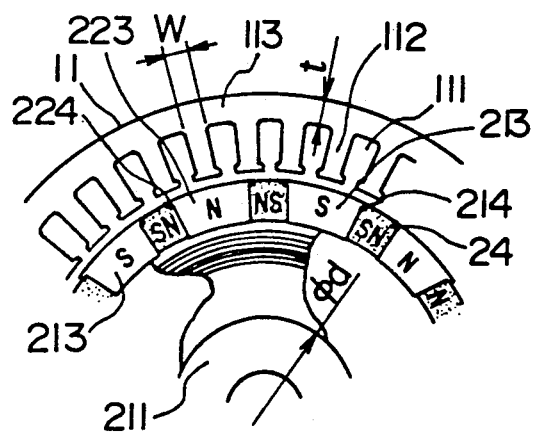
FIG. 2 is a sectional view showing a part taken along a line II—II in FIG. 1.
Figure 3:
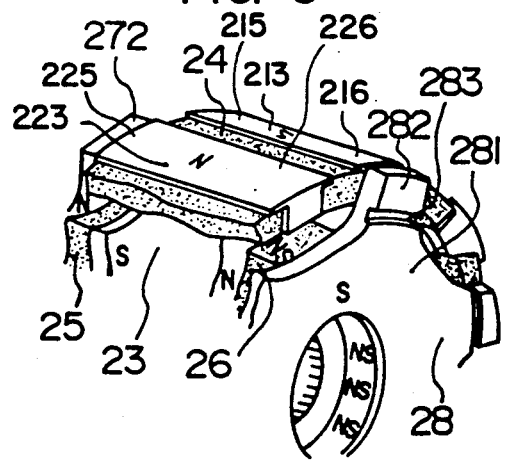
FIG. 3 is a perspective view showing a principal part of the rotor shown in FIG. 1.

As shown in FIGS. 2 and 3, the claw-shaped magnetic pole portions 213 and 223 have sections of near rectangular bar form, and permanent magnets 24 of anisotropic ferrite having rectangular bar shape are inserted between adjacent claw-shaped magnetic pole portions 213 and 223 and fixed thereto with an adhesive agent. Further, the permanent magnets 24 are magnetized in the width direction and are disposed so that opposing faces of adjacent permanent magnets 24 have the same polarity as shown in FIG. 2. Furthermore, the permanent magnets 24 are prevented from jumping out of the outer circumference of the rotor 2 due to the rotation of the rotor 2 by positioning the permanent magnets 24 on the inner circumferential sides of the collar portions 214 and 224.

Permanent magnet plates 25 and 26 each having a doughnut shape are magnetized in a thickness direction and resistance-welded to exterior sides of the projected portions 212 and 222. In this case, the outer edges of the permanent magnet plates 25 and 26 are provided underneath respective edges 215, 216, 225 and 226 of claw-shaped magnetic pole portions 213 and 223. Further, the permanent magnet plates 25 and 26 are magnetized in a direction that same poles face each other with respect to N poles and S poles of the projected portions 212 and 222.

First and second soft steel yoke plates 27 and 28 are disposed on the outer faces of the permanent magnet plates 25 and 26 respectively. These yoke plates 27 and 28 are composed of doughnut-shaped disc portions 271 and 281 each being the same size as the permanent magnet plates 25 and 26. The doughnut shaped disc portions have six star-like protrusions 272 and 282 respectively which extend from the outer circumferences of the doughnut-shaped disc portions 271 and 281 and abut against end faces of the edges 225 and 216 respectively. Further, bottleneck portions 273 and 283 reducing the magnetic path areas are formed between the doughnut-shaped disc portions 271 and 281 and the star-like protrusions 272 and 282. Further, the star like protrusions 272 of the first yoke plate 27 are welded and fixed to an end faces of edge 225 of the claw-shaped magnetic pole portion 223 of the second magnetic pole core 22. The star-like protrusions 282 of the second yoke plate 28 are welded and fixed to the end faces of edges 216 of the claw-shaped magnetic pole portions 213 of the first magnetic pole core 21.

Figure 4:
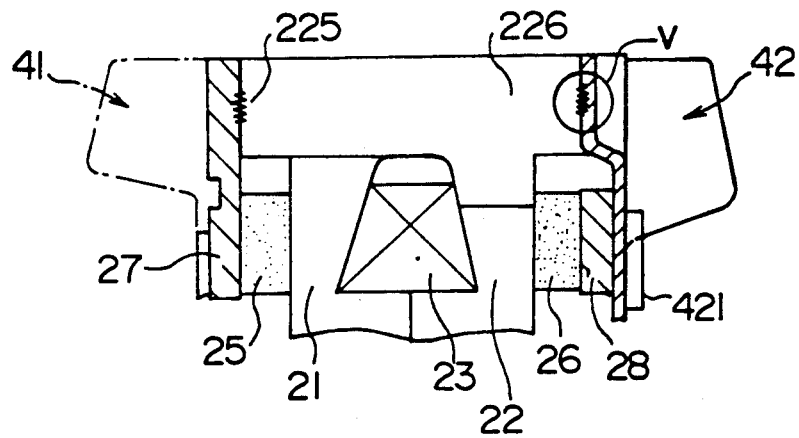
FIG. 4 is a sectional view showing a principal part in a state that a fan is fitted in FIG. 1.
Figure 5:
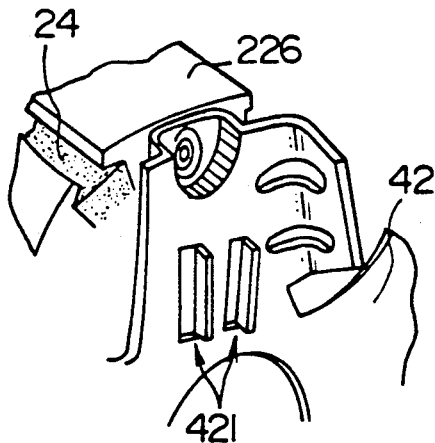
FIG. 5 is a perspective view of circle v in FIG.4 showing a principal part of FIG. 4.

A front fan 41 and a rear fan 42 are disposed on the outer faces of the first and the second yoke plates 27 and 28, respectively. Fan 41 is welded and fixed to the end face of edge 215 of the claw-shaped magnetic pole portion 213 of the first magnetic pole core 21. Fan 42 is welded and fixed to the end face of edge 226 of the claw-shaped magnetic pole portion 223 of the second magnetic pole core 22 as shown in FIGS. 4 and 5. These fans 41 and 42 are for cooling the three-phase armature winding 12. As shown in FIG. 5, fan 42 has cooling fins 421.

In the above-mentioned construction, the field circuit will be described. First, by applying an electric current to the field winding 23, a first field circuit is formed in which magnetic flux is applied to the projected portion 212 through the boss portion 211 of the first magnetic pole core 21, and the travels through the claw-shaped magnetic pole portion 213, the iron core 11, the claw-shaped magnetic pole portion 223 of the second magnetic pole core 22, the projected portion 222, the boss portion 221, and the boss portion 211 of the first magnetic pole 21.

In this field circuit, the magnetic path sectional area of the iron core 11 per one pole occupies approximately 60 percent of the magnetic path sectional area of the stator 1. In other words, 60 percent of the magnetic sectional area of the stator 1 is equal to approximately 60 percent of the sectional area of three pieces of tooth sections 112 of the iron core 11 which is opposite a magnetic pole, or is equal to two times the sectional area of back portion 113 corresponding to a magnetic pole. As to an AC generator for a vehicle, Lundell type claw-shaped magnetic poles are used in most cases. In this case, however, much leakage is produced between claw-shaped magnetic pole portions 213 which results in a 223, and leakage flux of approximately 30 to 40 percent of the total generated magnetic flux. Accordingly, the sectional areas of the boss portions 211 and 221 are formed about 1.4 times or greater than the minimal portion in the magnetic path sectional area of the iron core 11 as a matter of certainty in point of design. Next, as to the above-mentioned projected portions 212 and 222, their magnetic path sectional areas at each of the boss portions 211 and 221 is almost equal to the sectional area of each of the boss portions 211 and 221. The magnetic path sectional area of the projected portions 212 and 222 are gradually increased in the direction of the stator 1 as shown in FIG. 1. That is, the projected portions 212 and 222 show a taper form and present a configuration of increasing wall thickness. The portions where the wall thickness is increased are located at the projected portions 212 and 222 where the permanent magnet plates 25 and 26 are installed.

Further, the field winding 23 is set so that the applied electric current reaches approximately 3.3 A at the time of rated operation with the number of turns at 333, so that $Fe = 333 \times 3.3 \approx 1,100$ ampere turns where Fe is the field magnetomotive force.

The magnetic flux of the permanent magnets 24 form a second magnetic circuit in which the magnetic flux returns to a permanent magnet 24 through the claw-shaped magnetic pole portion 223 of the second magnetic pole core 22, the air gap 5, the iron core 11, the air gap 5 and the claw-shaped magnetic pole portion 213 of the first magnetic pole core 21.

Further, the magnetic flux of the permanent magnet plate 25 forms a third magnetic circuit in which the magnetic flux returns to the permanent magnet plate 25 through the first yoke plate 27, the claw-shaped magnetic pole portion 223 of the second magnetic pole core 22, the air gap 5, the iron core 11, the air gap 5, the claw-shaped magnetic pole portion 213 of the first magnetic pole core 21 and the projected portion 223. Furthermore, the magnetic flux of the permanent magnet plate 26 forms a fourth magnetic circuit in which the magnetic flux returns to the permanent magnet plate 26 through the projected portion 222 of the second magnetic pole core 22, the claw-shaped magnetic pole portion 223, the air gap 5, the iron core 11, the air gap 5, the claw-shaped magnetic pole portion 213 of the first magnetic pole core 21 and the second yoke plate 28. Next, in the second thru the fourth magnetic field circuits, the permanent magnets 24, and permanent magnet plate 25 and 26 are anisotropic ferrite magnets with magnetizing characteristic feasible axes made in accord with a magnetizing direction required. A plate thickness, material quality and magnetizing characteristic of each permanent magnet and permanent magnet plates are set almost the same and an internal magnetomotive force $F_{mo}$ per one magnetic pole with respect to respective second, third and fourth field circuits is arranged almost equally to be $F_{mo}=1,200$ ampere turns at the time of operation with respect to the second thru the fourth magnet field circuits.

Armature reaction is generated due to the fact that a load current is applied to the armature at the time of operation, but it is designed so that, referring to a direct-axis reaction component as $F_{rd}$, approximately $F_{rd} \approx 800$ ampere turns are produced at the time of rated output.

Figure 6:
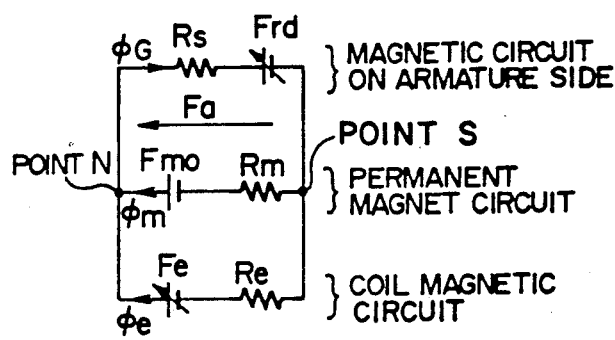
FIG. 6 is an equivalent magnetic circuit of an AC generator of the present invention.

When it is assumed that a combined magnetic resistance of one pole portion is $R_m$ and a magnetic resistance of a stator side magnetic path including the air gap 5 is $R_s$ in an equivalent circuit per one pole shown in FIG. 6, magnetic resistances of the second thru the fourth magnetic field circuits are designed so that approximately $R_m \approx R_s$.

Next, characteristic operation and effect of the AC generator of this invention will be described hereunder, basic operation of power generation as an AC generator for a vehicle being omitted since it is well known.

The magnetic flux generated from the first magnetic field circuit by electric current conduction in the field winding 23 is added to the magnetic flux generated from the second thru the fourth magnetic field circuits by the permanent magnets 24, and permanent magnet plates 25 and 26, and are supplied to the iron core 11 of the stator 1. Accordingly, little magnetic flux of the field winding 23 (the first magnetic circuit) may suffice for operation since the magnetic flux to the iron core 11 of the stator 1 is originally added with the magnetic flux of the second thru the fourth magnetic field circuits. Thus, the sectional area of the boss portions 211 and 221 of the first and the second magnetic pole cores 21 and 22 may be made smaller than the sectional area of the iron core 11 of the stator 1. As a result, a mean winding diameter being reduced, the field winding 23 may be provided with a greater number of turns than the case when a same resistance value is set (namely, the case when setting is made so that the same field current is applied since the applied voltage is the same generator output voltage). That is, when the diameters of the cylindrical boss portions 211 and 221 are reduced, an effect is obtained that the wound outside diameter of the field winding 23 is reduced more than the boss diameter reduction quantity but produces the same field ampere turns.

Further, since the wound outside diameter of the field winding 23 can be made small, the radial position at which the claw-shaped magnetic pole portions 213 and 223 are disposed may be made closer to the boss portions 211 and 221 accordingly, thus making it possible to make the diameter of the whole rotor 2 small.

Furthermore, since it is possible to make the outside diameters of the boss portions 211 and 221 small, the distance between the outer circumference of the field winding 23 and the inner circumferential of the claw-shaped magnetic pole portions 213 and 223 can be made long even if the claw-shaped magnetic pole portions 213 and 223 are not made small in size. Thus, it is possible to cool the field winding 23.

The permanent magnet plates 25 and 26 are located near to and cooled by the cooling fans 41 and 42. Permanent magnet plates 25 and 26 are also located remotely against the field winding 23 which generates heat, and further, the permanent magnets 24 are located near to the outer circumferential face of the rotor 2 where heat dissipation is comparatively high. Therefore, the permanent magnets 24, and permanent magnet plates 25 and 26 seldom rise in temperature, and thus are scarcely subject to a detrimental influence by lowering output of the generator itself or due to a rise in atmospheric temperature in operation.

Since the permanent magnet plates 25 and 26 are installed underneath the edges 215, 216, 225 and 226 of the claw-shaped magnetic pole portions 213 and 223, a simple plate shape may be adopted for the first and the second yoke plates 27 and 28 as shown in FIG. 3.

Furthermore, bottleneck portions 273 and 283 are provided on these first and second yoke plates 27 and 28 so as to restrict with saturation the maximal value of the passing magnetic flux. Therefore, the situation where stator 1 receives useless excessive magnetic flux, and overvoltage is generated when an electric load is light, or an electric current is not applied to the field winding 23 is suppressed.

The operation and effects as to setting at $F_{mo}=1,200$ ampere turns, $F_{rd}=800$ ampere turns, $R_m \approx R_s$ and $F_e=1,100$ ampere turns, respectively, with respect to an internal magnetomotive force $F_{mo}$ of the permanent magnet, a direct-axis armature reaction magnetomotive force $F_{rd}$, a magnetic resistance $R_s$ including the stator 1 and the air gap 5 which are opposite to each other between a pair of different magnetic poles and the combined magnetic resistance $R_m$ regarding one pole portion of the above-mentioned permanent magnet magnetic field circuit will be described.

The above mentioned bottleneck portions 273 and 283 provided on the yoke plates 27 and 28, the magnetomotive force specified as $F_{mo}=1,200$ ampere turns, $F_{rd}=800$ ampere turns and $F_e=1,100$ ampere turns, and the magnetic resistance relationship $R_m \approx R_s$ are hereinafter referred to as "construction (a)".

An equivalent magnetic field circuit of the rotor 2 per one pole pair including an armature is shown in FIG. 6. There are the following relational expressions between a point N and a point S in FIG. 6. Here, a magnetomotive force difference between the faces of the claw-shaped magnetic pole portions is assumed to be $F_a$. Besides, it is assumed that $R_m$ may be regarded almost linear for simplicity sake.

$$\phi_G = \frac{F_a - F_{rd}}{R_s}, \quad \phi_m = \frac{F_{mo} - F_a}{R_m}, \quad \phi_e = \phi_m + \phi_e$$

Figure 7:
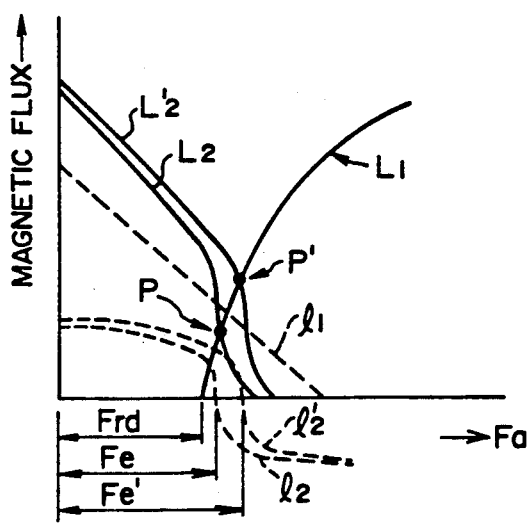
FIG. 7 is a characteristic diagram showing the magnetic flux with respect to a magnetomotive force difference Fa between claw-shaped magnetic pole portions.

It has been found that the operation of the generator may be expressed in a magnetic flux-$F_a$ coordinate plane based on these relational expressions as shown in FIG. 7.

A curve $L_1$ is obtained by means of parallel displacement of a relational diagram of the magnetic flux which passes in the magnetic path on the armature side with respect to the magnetomotive force between magnetic poles by the portion of the armature direct-axis reaction $F_{rd}$, and $l_2$ and $l_2'$ are obtained by means of parallel displacement of a relational diagram of magnetic flux-magnetomotive force of a Lundell type field circuit by the portion of the ampere turns $F_e$ or $F_e'$ of the field winding and inversion into $-F_a$ scale. Also, $l_1$ shows a relational diagram of the magnetomotive force $F_a$ and the generated magnetic flux with respect to above-mentioned permanent magnet field circuit. $L_2$ and $L_2'$ are obtained by adding $l_1$ to $l_2$ or $l_1$ to $l_2'$ and show relational diagrams between the magnetic flux going from the whole rotor toward the armature side and $F_a$. It is apparent from these diagrams that the operating point is given as an intersection P of the lines $L_1$ and $L_2$ or an intersection P' of the lines $L_1$ and $L_2'$.

When intersections P and P' are examined closely with reference to FIG. 7, it is understood that the operation at the point P is in a state that a part of the magnetic flux which is to go toward the armature originally is circuited to the Lundell type field core side at that time since the point P is below the line $l_1$ which is also a magnetic flux generating capacity line of the permanent magnet. On the other hand, as to the point P', it is understood that the operation thereat is in a state that the magnetic flux from a Lundell type field core is added to the magnetic flux generated originally in the permanent magnet magnetic circuit reversely to the above. It is an aim of the present invention to improve the output per weight or to provide a compact and low-cost generator by generating a magnetic flux by adding the magnetic flux from both the permanent magnet and the electromagnet field circuit thereby to increase the utilization factor of constituent materials. It has been found that it is only required to operate the generator under the condition at the point P'. That is, the condition of adding magnetic fluxes is obtained from the diagram, as follows:

$$\frac{R_m F_{rd} + R_s F_{mo}}{R_m + R_s} \leq F_e$$

Namely, when field winding ampere turns $F_e$ having a magnitude determined by this relational expression is given, the magnetic fluxes are added together.

Based on such a thought, it is considered that the larger $F_e$ is, the better. However, it is a mater of course that irreversible demagnetization of the magnet itself is generated if $F_e$ is too large. It is related to a position and a configuration of an inflection point of the demagnetization curve whether demagnetization is generated or not, it has been known that it may safely be said that irreversible demagnetization is generated in an ordinary magnet when a field magnetomotive force which exceeds at least above-mentioned internal magnetomotive force $F_{mo}$ is applied. It has been found in view of above-mentioned knowledge and consideration that the magnetomotive force $F_e$ of the field winding has to be given under the following condition.

$$\frac{R_m F_{rd} + R_s F_{mo}}{R_m + R_s} \leq F_e \leq F_{mo} \quad \text{(b)}$$

When above-mentioned "construction (a)" is applied while referring to the contents of the above description and the expression (b) which is the conclusion thereof, the following expressions are obtained.

$$\frac{R_m F_{rd} + R_s F_{mo}}{R_m + R_s} = \frac{R_m (800 + 1{,}200)}{R_m (1 + 1)} = 1{,}000 \text{ ampere turns}$$

$$F_{mo} = 1{,}200 \text{ ampere turns}$$

On the other hand, $F_e = 1{,}100$ ampere turns meet magnetic flux adding condition shown in the expression (b), and it is understood that the operation displaying the effects aimed at by the present invention is performed.

In addition to the description of the construction and the operation thereof, an experimental example obtained by applying the present embodiment practically will be shown hereafter.

As a result of applying a construction of the present invention in an AC generator for a vehicle of 12 V, 100 A class and having a weight of 4.9 Kgs, a result of 12 V, 156 A and a weight of 5.1 Kgs were obtained. Namely, when comparison is made with respect to output W/Kg value per weight, an unprecedented improvement from 245 W/Kg to 367 W/Kg was confirmed.

I claim:

1. An AC generator comprising:
   a rotor having at least a first and second magnetic pole core opposing each other and similar in shape and size, said magnetic pole core having a center hole for piercing by a shaft of said rotor, said first and second magnetic pole cores each including a boss portion of cylindrical form having a given wall thickness surrounding said center hole, a projecting portion extending from said boss portion in a radial direction of said rotor, and a claw-shaped magnetic pole portion extending in an axial direction of said rotor from an end of said projecting portion that extends in said radial direction of said rotor, wherein said claw-shaped magnetic pole portions of said first and second magnetic pole cores extend in opposite axial directions of said rotor and oppose each other in said axial direction;
   a stator disposed around said rotor with a predetermined gap between said stator and said rotor, said stator having a stator winding;
   a field winding wound on interior portions of said boss portions of said first and second magnetic pole cores for supplying magnetic flux to said rotor in a given direction when electric current is applied to said field winding;
   at least a first annular permanent magnetic plate magnetized in a direction of its thickness, and fixed to an exterior side face of a projecting portion of one of said first and second magnetic pole cores for supplying magnetic flux in said given direction; and
   at least a first annular yoke plate, abutting an exterior face of said permanent magnetic plate and attached to a claw-shaped magnetic pole portion of a magnetic pole core to which said permanent magnetic plate is not fixed.

2. An AC generator according to claim 1, further comprising a second annular permanent magnetic plate fixed to said exterior side face of said projecting portion of said magnetic pole core which said first annular permanent magnetic plate is not fixed.

3. An AC generator according to claim 2, further comprising bar shaped permanent magnets magnetized in a direction of their width inserted in spaces between adjacent claw-shaped magnetic pole portions, said bar shaped permanent magnets being magnetized so that adjacent faces of said bar shaped permanent magnets have the same polarity.

4. An AC generator according to claim 2, further comprising a second annular yoke plate, said first and second annular yoke plates having star-like protrusions from the periphery thereof each of said annular yoke plates abutting an exterior face of said first and second annular permanent magnetic plates respectively, said first and second annular permanent magnetic plates fixed to said first and second magnetic pole cores, respectively, said star-like protrusions of said first yoke plate being fixed to said claw-shaped magnetic pole portion of said second magnetic pole core and said star-like protrusions of said second yoke plate being fixed to said claw-shaped magnetic pole portion of said first magnetic pole core.

5. An AC generator according to claim 2, wherein a sectional area of said projecting portions of said first and second magnetic pole cores becomes larger in a radial direction of said rotor.

6. An AC generator according to claim 4, wherein said star-like protrusions of said first and second annular yoke plates have bottleneck portions for reducing a magnetic path area thereof.

7. An AC generator according to claim 1, wherein said claw-shaped magnetic pole portions of said first and second magnetic pole cores extend in said axial direction of said rotor past said exterior side faces of said projecting portions of said first and second magnetic pole cores.

* * * * *